United States Patent [19]

Ettlinger

[11] 4,431,031
[45] Feb. 14, 1984

[54] PRE-RINSE HOSE

[75] Inventor: Ralph Ettlinger, Glencoe, Ill.

[73] Assignee: Amco Corporation, Chicago, Ill.

[21] Appl. No.: 363,252

[22] Filed: Mar. 29, 1982

[51] Int. Cl.$^3$ .............................................. F16L 13/14
[52] U.S. Cl. .................................... 138/109; 138/110; 138/124; 138/126; 138/127; 285/256
[58] Field of Search ............... 138/109, 110, 122, 123, 138/124, 125, 126, 127; 285/8, 174, 256

[56] References Cited

U.S. PATENT DOCUMENTS

| | | | |
|---|---|---|---|
| 1,630,895 | 5/1927 | Herbst | 138/127 |
| 1,978,211 | 10/1934 | Loughead | 138/125 |
| 2,166,448 | 7/1939 | Schuknecht et al. | 138/110 |
| 2,185,741 | 1/1940 | Sorg et al. | 138/110 |
| 2,515,929 | 7/1950 | Ofeldt | 138/124 |
| 2,700,988 | 2/1955 | Smisko | 138/109 |
| 3,287,315 | 11/1966 | Connor et al. | 138/127 |
| 3,725,167 | 4/1973 | Love et al. | 138/127 |
| 3,779,308 | 12/1973 | Buhrmann et al. | 138/125 |
| 4,114,656 | 9/1978 | Kish | 138/109 |
| 4,259,989 | 4/1981 | Lalikos et al. | 138/127 |

FOREIGN PATENT DOCUMENTS 21785 of 1904 United Kingdom ............... 138/125

Primary Examiner—John W. Shepperd
Attorney, Agent, or Firm—Laff, Whitesel, Conte & Saret

[57] ABSTRACT

A pre-rinse hose for use in the food service industry is provided. A core section is formed from an inner tube extruded from a rubber compound, a layer of textile braid applied to the inner tube and an outer tube extruded from a rubber compound over the textile braid. A steel braid is applied around the outer tube and a cover of polyvinyl plastic material is extruded over the steel braid. A hollow stem is held in each end of the hose by a ferrule which is crimped and compressed over the hose ends. A wrench-faced nut is disposed on each hollow stem to connect one end of the hose to a faucet and the other end to a pre-rinse spray head. A spring is applied around the end of the hose connected to the faucet to reinforce the hose against breakage.

14 Claims, 5 Drawing Figures

U.S. Patent  Feb. 14, 1984  4,431,031
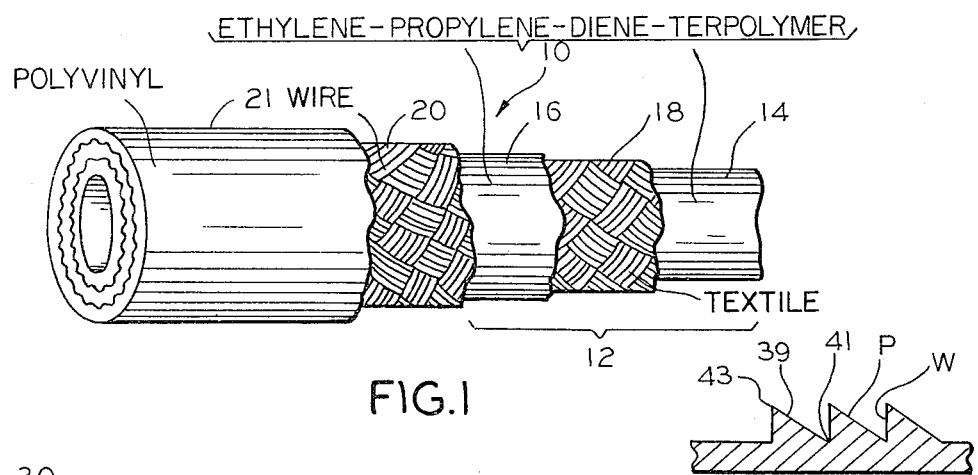
FIG. 1
FIG. 2A PRIOR ART
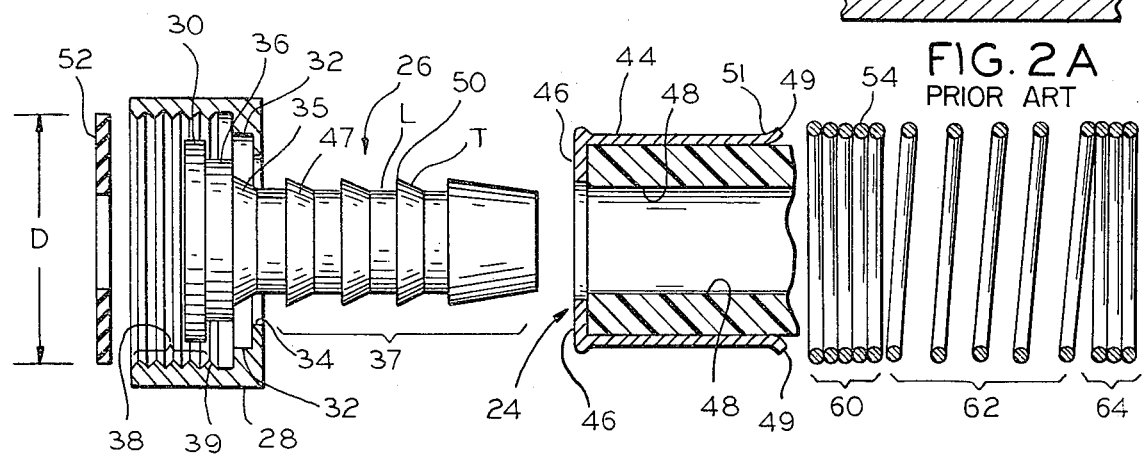
FIG. 2
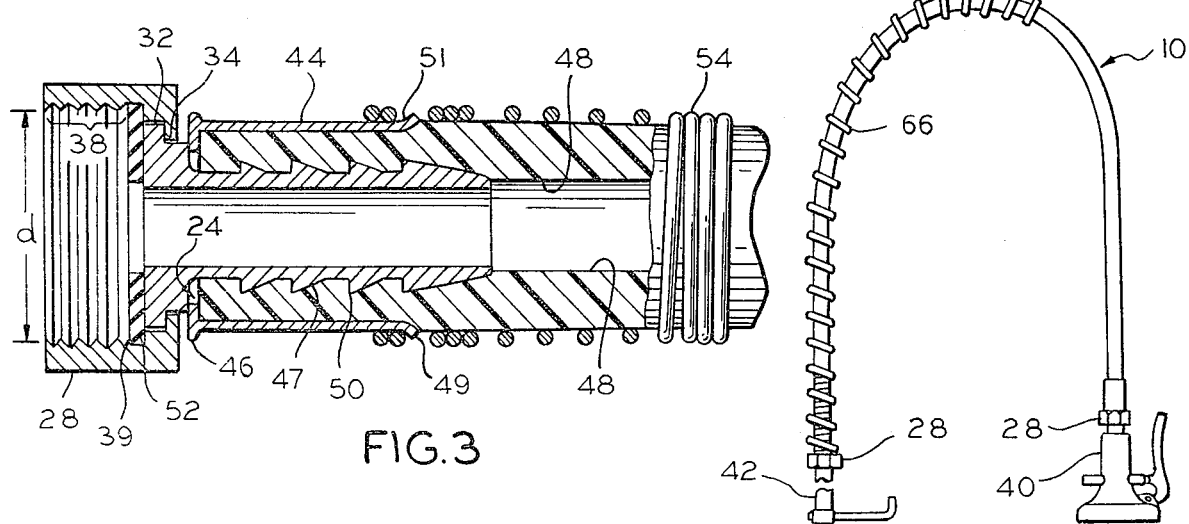
FIG. 3
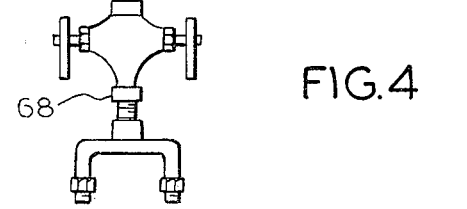
FIG. 4

PRE-RINSE HOSE

BACKGROUND OF THE INVENTION

This invention relates to flexible hoses and more particularly to flexible hoses used in the food service industry for pre-rinsing dishes, pots, pans and the like.

In restaurant, hospital, dormitory and similar industrial kitchens it is important to thoroughly wash and sanitize the dishes, pots, pans, silverware and the like (hereinafter collectively referred to for convenience as "dishes") after each use since the same dishes are used repeatedly to prepare and serve food for many different people. If the dishes are not properly washed and sanitized, diseases or illnesses may be spread from one person to another or people may become ill from food poisoning or the like.

A problem encountered in properly cleaning dishes in industrial kitchens is that food or other waste often becomes caked onto the surface of the dishes after a meal, making it difficult to properly wash the dishes in a commercial dishwasher. The dishes must often be put through the dishwasher more than once to thoroughly clean and sanitize them. This is inefficient and time consuming.

In an effort to solve this problem, dirty dishes are often rinsed with a hot-water spray to soften and remove caked on food and other waste before placing the dishes in the dishwasher. This is commonly known in the food service industry as "pre-rinsing". Pre-rinsing usually takes place in an area near the dishwasher where there is a faucet to supply hot water. A spray head attached to a hose is used to rinse the dishes.

The standard pre-rinse spray hose is about four feet in length and comprises a flexible rubber tube covered by a flexible metal casing. Because the hoses are subject to rough handling and to large bending stresses when used to clean the large number of dishes washed in the typical industrial kitchen, the hoses often wear out quickly and break adjacent the connection to the faucet. Another problem encountered with these pre-rinse hoses is that the rubber tube and metal casing do not provide sufficient insulation for the hot water that is used to pre-rinse the dishes. Consequently, heat is lost as the water travels through the hose and the temperature of the water that reaches the dishes may be considerably less than the temperature at the faucet. This reduces the efficiency of the pre-rinsing process.

Accordingly, an object of this invention is to provide a pre-rinse hose that is flexible and easy to handle, but is sturdy in construction and will last longer than prior art hoses.

Another object of this invention is to provide a pre-rinse hose that effectively resists the bending stresses encountered in the area adjacent the connection to the faucet.

A further object of this invention is to provide a pre-rinse hose that is economical and efficient to manufacture.

Yet another object of this invention is to provide a pre-rinse hose that is better insulated, but lighter in weight, than prior art hoses.

Further objects will become manifest from the description, drawings and claims.

SUMMARY OF THE INVENTION

In keeping with one aspect of the invention, a pre-rinse hose comprising a core section extruded from ethylene-propylene-diene-terpolymer is provided. The core section is formed by an inner tube, a layer of textile braid applied around the inner tube and an outer tube extruded around the textile braid. A stainless steel braid is applied around the outer tube and a cover of polyvinyl plastic is extruded around the steel braid. A hollow stem is disposed in each end of the hose with a portion of the stem extending outwardly from the hose, upon which a flange is disposed. A ferrule is crimped and compressed over each end of the hose to securely fasten the hollow stems in the hose. A wrench-faced nut fits over each stem between the hose and stem flange. The nut is provided with an internally threaded section to receive a faucet at one end of the hose and a pre-rinse spray head at the other end.

DESCRIPTION OF THE DRAWINGS

FIG. 1 is a partial perspective view of one embodiment of this invention with portions broken away;

FIG. 2 is an exploded view in cross section of an end of the pre-rinse hose forming a part of the embodiment of FIG. 1;

FIG. 2A is a partial view in cross section of prior art end fitting hardware;

FIG. 3 is a view in cross section of the end of the pre-rinse hose shown in FIG. 2 and forming a part of the embodiment of FIG. 1; and FIG. 4 is a view of the embodiment of FIG. 1 attached to a riser pipe extending from a faucet and a spray head.

DESCRIPTION OF THE PREFERRED EMBODIMENT

As shown in FIG. 1, pre-rinse hose 10 comprises rubber compound core tube 12 which is formed from tubes 14 and 16. Tube 12 is reinforced by textile braid 18, such as nylon or polyester, which is disposed between tubes 14 and 16. Tube 12 is preferably made from a rubber compound of ethylene-propylene-diene-terpolymer, commonly referred to as EPDM. Inner tube 14 is first extruded, textile braid 18 is applied around the tube and then outer tube 16 is extruded around the inner tube 14 and braid 18. EPDM can withstand the high temperatures of the hot water used to pre-rinse the dirty dishes, is resistant to tearing from the bending stresses encountered during use, provides the necessary flexibility for easy handling and also provides a strong holding surface for end fitting hardware.

Another layer of braid 20, preferably wire, is applied around tube 12 as reinforcement (FIG. 1). Together with the textile reinforcement 18, braid 20 provides structural and burst strength to hose 10. Reinforcement 18 and 20 enables tube 12 to withstand pressure without distending, affords resistance to collapse and permits control of movement and flexibility. The reinforcement also helps provide a firm anchorage for end fitting hardware.

Cover 21 is extruded or otherwise applied over steel braid 20 and tube 12. The cover 21 is preferably made from polyvinyl plastic material which is resistant to tearing and the high temperatures of the hot water used in pre-rinsing. Cover 21 also strengthens the hose against breaking and wear that results from bending stresses encountered during use. Tube 12, steel braid 20, and cover 21 provide three layers of insulation to reduce heat loss from the hot water running through the hose. Reinforcement 20 creates an insulating air space between tube 12 and cover 21 which also helps to reduce heat loss. Although this novel construction is lighter in weight than prior art pre-rinse hoses, it withstands bending stresses and insulates against heat loss better than such prior art hoses. These are important advantages over the prior art.

Ferrule 44 slips over ends 22, 24 of hose 10 with a slight clearance. By way of example, FIGS. 2 and 3 show ferrule 44 associated with end 24. Outwardly curving flare 51 is formed on the end 49 of ferrule 44 when ferrule 44 is crimped around the hose ends to secure the end fitting hardware. Flare 51 provides a slight clearance between the edge of end 49 and cover 21 to enable hose 10 to bend or flex at end 49 without being cut by ferrule 44, as would happen if flare 51 were not provided.

A suitable hollow stem 26 is provided to complete a metal to rubber seal at each of the two ends 22, 24 of the hose 10. FIGS. 2 and 3 show, by way of example, the stem 26 which is associated with end 24. Each stem is an integral metallic (here brass) member comprising a flange 30 followed by a step 36 and tapered portion 35 leading to a reduced cyindrical part 37. When stems 26 are inserted in hose ends 22, 24, end 46 of ferrule 44 abuts step 36 on stems 26.

Distributed along the length of the cylinder 37 on stem 26 are a plurality of spaced annular barbs 47 which comprise a tapered region T leading to a sharp edge 50. Annular barbs 47 are separated by annular lands L which are essentially the flat surface of the cylindrical part 37. Ideally, the outside diameter of the annular lands L is approximately the same as the inside diameter of the tube 12 while the outside diameter of the barbs 47 is preferably in the range of approximately 1.10 to 1.15 of the inside diameter of the tube 12.

On prior art end fitting hardware (FIG. 2A), serrations 39, similar to barbs 47 on stem 26, rise directly from wall W at root 41 to form sharp edge 43. There is no separation, however, between the inclined plane P and the wall W at root 41 as provided by the lands L on the present invention.

When ferrule 44 is suitably crimped and compressed around end 24, as shown in FIG. 3, a tight interference fit is created between barbs 47 on stem 26 and the inside surface 48 of tube 12. The configuration of barbs 47 and lands L on this invention enables barbs 47 to more positively engage tube 12 than the serrations 39 on the prior art end fitting hardware as shown in FIG. 2A.

Before hollow stems 26 are inserted into hose ends 22, 24, a wrench-faced nut 28 is slipped over each of the stems with a loose fit. Flange 30 on hollow stem 26 sits in recessed seat 32 on nut 28. Nut 28 is provided with a smooth inner bore 34 to fit around step 36 and internal threads 38 to receive the externally threaded ends (not shown) of spray head 40 and of riser pipe 42. The loose fit of nut 28 over stem 26 permits the nut to be turned to tighten it about the connection to the spray head 40 and riser pipe 42.

Washer 52 (see FIGS. 2 and 3) fits tightly between flange 30 and the internally threaded section 38 of nut 28. The outside diameter D of washer 52 (FIG. 2) is slightly greater than the minor diameter d of threaded section 38 (FIG. 3), so that washer 52 fits snugly beneath the innermost thread 39 of section 38 to create a tight seal and to prevent water from leaking out between the stem 26 and nut 28 (FIG. 3).

Spring 54 fits over either end 22 or 24 of hose 10. Preferably, the spring is placed over end 24 (FIGS. 2 and 3), which is attached to riser pipe 42, since breakage from bending stresses most often occurs in the hose adjacent the connection to the riser pipe. Spring 54 may, however, also be secured to end 22 of the hose adjacent spray head 40.

Spring 54 comprises three sections 60, 62 and 64. Sections 60 and 64 are tightly wound and section 62 is more loosely wound (FIG. 2). Flare 51 on ferrule 44 provides an economically efficient method for several twists of the spring to be threaded over ferrule 44, as shown in FIG. 3. This anchors spring 54 in place so that it does not slip off ferrule 44. Spring 54 thus helps to relieve the bending stresses applied to the hose section adjacent the connection to riser pipe 42 and to prevent breakage in that section, an important improvement over prior art hoses. The same beneficial effects are achieved at end 22 when a spring is secured to that end.

In use, a large spring 66 is placed around the hose as shown in FIG. 4 so that the hose hangs properly from riser pipe 42. The hose is then connected by means of nut 28 to externally threaded riser pipe 42 which extends from faucet 68. Spray head 40 is secured to the other end of the hose (22) by means of nut 28. Hose 10 is then ready for operation.

While specific embodiments of this invention have been shown and described, modifications thereof may be made which fall within the spirit and scope of this invention. The appended claims are, therefore, intended to cover any such modifications, as well as the embodiments specifically disclosed herein.

I claim:

1. A pre-rinse hose for use in coupling a faucet and pre-rinse spray head comprising an inner tube having openings at opposite ends; textile braid applied around the inner tube; an outer tube disposed around the textile braid, said outer tube having openings at opposite ends; a wire braid applied around the outer tube, a cover disposed around the wire braid to create an air space between said outer tube and said cover; a hollow stem securely fixed in each end of said inner tube, said hollow stem having a body disposed within said inner tube and a portion extending outwardly from said inner tube with a flange disposed on the end of said portion outside of said inner tube and a plurality of outwardly extending spaced-apart, sharp-edged annular barbs disposed on the body of the stem to bite into the inner tube of the hose; a ferrule adaptable to be crimped and compressed over each end of said hose to compress the hose around said hollow stems; and a wrench-faced nut disposed on each of said stems between said hose and stem flange, said nut having an internally threaded section to receive said faucet and spray head; and a spring disposed around the end of the hose connected to the faucet.

2. The article of claim 1 wherein said textile braid is made from nylon.

3. The article of claim 1 wherein said textile braid is made from polyester.

4. The article of claim 1 wherein said inner and outer tubes are made of an extruded rubberlike compound.

5. The article of claim 4 wherein said inner and outer tubes are made from ethylene-propylene-diene-terpolymer.

6. The article of claim 5 wherein said cover is made from extruded polyvinyl plastic material and the wire braid is made of stainless steel.

7. The article of claim 1 wherein said barbs comprise a tapered portion which forms an inclined plane leading to said sharp edge and each of said barbs is separated by an annular land.

8. The article of claim 7 wherein the outside diameter of the annular lands is approximately the same as the inside diameter of the inner tube and the outside diameter of the annular barbs is in the range of 1.10 to 1.15 of the inside diameter of the inner tube.

9. The article of claim 1 wherein said ferrule includes an end extending inwardly to abut said stem.

10. The article of claim 9 wherein there is a loose fit between said nuts and said hollow stems and each of said nuts includes an interior recessed seat adapted to receive said stem flange.

11. The article of claim 10 including a washer adapted to fit within the wrench-faced nut to create a tight seal between the nut and the stem.

12. The article of claim 11 wherein the diameter of the washer is slightly greater than the minor diameter of the internally threaded section of the nut.

13. The article of claim 1 wherein said spring comprises a tightly wound section at each end of the spring and a more loosely wound section extending between said two end sections.

14. The article of claim 1 wherein each of said ferrules includes an outwardly curving flare at the end of the ferrule opposite said end which abuts the stems and said spring is partially threaded over said flare.

* * * * *